United States Patent
Massey et al.

(10) Patent No.: US 6,842,930 B2
(45) Date of Patent: Jan. 18, 2005

(54) RUN-OFF GUARD FOR A DOCK LEVELER (75) Inventors: Douglas H. Massey, New Berlin, WI (US); Kim Duvernell, Brown Deer, WI (US); Michael M. Meichtry, Brookfield, WI (US)

(73) Assignee: SPX Dock Products Inc., Sussex, WI (US)

( * ) Notice: Subject to any disclaimer, the term of this patent is extended or adjusted under 35 U.S.C. 154(b) by 135 days.

(21) Appl. No.: 10/071,595

(22) Filed: Feb. 8, 2002

(65) Prior Publication Data
US 2002/0108191 A1 Aug. 15, 2002

Related U.S. Application Data
(60) Provisional application No. 60/267,891, filed on Feb. 9, 2001.

(51) Int. Cl.[7] .................................................. E01D 1/00
(52) U.S. Cl. .......................................... 14/71.3; 14/71.1
(58) Field of Search ................................ 14/69.5, 71.1, 14/71.3, 71.5, 71.7

(56) References Cited

U.S. PATENT DOCUMENTS

| 2,639,450 | A | 5/1953 | Ramer |
| 2,689,965 | A | 9/1954 | Fenton |
| 2,993,219 | A | 7/1961 | Pennington |
| 3,280,414 | A | 10/1966 | Layne |
| 3,424,323 | A | 1/1969 | Barnaby |
| 3,486,181 | A | 12/1969 | Hecker, Jr. et al. |
| 3,533,118 | A | 10/1970 | Rosengen |
| 3,786,530 | A | 1/1974 | Le Clear |
| 3,806,976 | A | 4/1974 | Yoon |
| 4,155,468 | A | 5/1979 | Royce |
| 4,304,518 | A | 12/1981 | Carder et al. |
| 4,325,155 | A | 4/1982 | Alten |
| 4,501,042 | A | 2/1985 | DiFonzo |
| 4,848,732 | A | 7/1989 | Rossato |
| 4,865,507 | A | 9/1989 | Trickle |
| 4,920,598 | A | 5/1990 | Hahn |
| 5,040,258 | A | 8/1991 | Hahn et al. |
| 5,157,801 | A | 10/1992 | Alexander |
| 5,311,628 | A | 5/1994 | Springer et al. |
| 5,333,339 | A | 8/1994 | Larsen |
| 5,343,583 | A | 9/1994 | Cook |
| 5,452,489 | A | 9/1995 | Gelder et al. |
| 5,457,838 | A | 10/1995 | Gelder et al. |
| 5,553,343 | A | 9/1996 | Alexander |
| 6,163,913 | A | * 12/2000 | DiSieno et al. ............. 14/71.3 |

FOREIGN PATENT DOCUMENTS

| CA | 935606 | 10/1973 |
| DE | 2634652 A1 | 2/1978 |
| DE | 2852888 A1 | 8/1980 |
| FR | 2296583 | 7/1976 |

* cited by examiner

Primary Examiner—Robert E. Pezzuto
Assistant Examiner—Alexandra K. Pechhold
(74) Attorney, Agent, or Firm—Baker & Hostetler LLP (57) ABSTRACT The dock leveler is adapted to be mounted to a loading dock and includes a ramp, a guard, and a biasing member. The ramp is rotatably coupled to the loading dock and the guard is rotatably coupled to the ramp. The guard is rotated between a raised position that forms a barrier and a lowered position that permits loading equipment to freely pass. The biasing member is coupled to the guard and biases the guard toward the raised position when the guard is in the raised position and biases the guard toward the lowered position when the guard is in the lowered position.

9 Claims, 12 Drawing Sheets

RUN-OFF GUARD FOR A DOCK LEVELER

This application claims the benefit of provisional application No. 60/267,891, filed Feb. 9, 2001.

FIELD OF THE INVENTION

The invention relates to dock levelers, and more particularly to run-off guards for dock levelers.

BACKGROUND OF THE INVENTION

A dock leveler typically includes a frame or supporting structure mounted in a pit or depression in the loading dock. The rear end of a ramp or deck plate is pivotally mounted to the supporting structure so that the ramp is movable between an inclined position and a declined position relative to the horizontal loading dock.

An extension lip is commonly pivotally mounted to the forward end of the ramp, and is movable between a downwardly hanging pendant position and an extended position in which the lip forms an extension to the ramp.

After a vehicle (e.g., a truck or trailer) has parked in front of the loading dock in preparation for a loading or unloading operation, the ramp of the dock leveler is raised to its inclined position. As the ramp is moved, the lip is pivoted outwardly to its extended position. When the ramp is lowered, the extended lip engages the bed of the truck to support the ramp such that the ramp and the lip in combination bridge the gap between the loading dock and the truck bed. After the loading or unloading operation is completed, the ramp can be raised and the lip falls by gravity to its pendant position. The ramp is then lowered to a stored, horizontal position and the truck can then pull away from the loading dock.

Some dock levelers also include run-off guards that provide a barrier at the outer end of the dock levelers to prevent loading equipment such as a forklift from rolling off of the dock. Run-off guards used on conventional dock levelers are movable between a raised position that forms a barrier and a lowered position that allows loading equipment to freely pass over the run-off guard. The simplest method for raising the run-off guard utilizes a run-off guard that is integral with the lip, as disclosed in German Patent No. 2634652. In this design, the run-off guard is raised when the lip is folded into the stored or pendant position, and the run-off guard is lowered when the lip is raised to the extended position. Another common method includes a run-off guard that is a separate component from the lip, but that is mechanically coupled to the lip such that the movement of the lip actuates the movement of the run-off guard. Such a design is disclosed in U.S. Pat. No. 5,333,339. These methods, however, do not facilitate end loading, which is necessary when cargo placed at the rear of the trailer prevents the lip from being extended on the bed of the trailer. Since the lip must remain lowered during end loading, the raised run-off guard usually prevents access to the cargo within the trailer.

Other devices lower the barrier independently of the lip to allow for end loading. Some devices require an actuator such as a hydraulic cylinder, while other passive devices are moved by springs and the like. One example of a passive device is shown in U.S. Pat. No. 3,486,181 that discloses a upwardly-biased barrier that is raised by releasing a latch mechanism used to hold the barrier in the lowered position. Another example is U.S. Pat. No. 5,553,343 that discloses a run-off guard that is actuated by a cam that is rotated in response to the raising and lowering of the ramp.

SUMMARY OF THE INVENTION

The present invention is directed to a dock leveler that includes a run-off guard that is raised and lowered in response to a passive linkage system that is moved by various components of the dock leveler. The run-off guard is raised when the ramp is raised to the inclined position. The run-off guard can be lowered from the raised position when the ramp is in the horizontal position and the lip is in the declined position by a manually-activated linkage to allow for convenient end loading. In addition, the run-off guard is automatically lowered from the raised position when the ramp is lowered to a declined position and the lip is in the pendant position to allow for below dock level end loading.

In one embodiment, the dock leveler is adapted to be mounted to a loading dock and includes a ramp, a guard, and a biasing member. The ramp is rotatably coupled to the loading dock and the guard is preferably rotatably coupled to the ramp. The guard is rotated between a raised position that forms a barrier and a lowered position that permits loading equipment to freely pass. The biasing member is coupled to the guard and biases the guard toward the raised position when the guard is in the raised position and biases the guard toward the lowered position when the guard is in the lowered position.

In another embodiment, the dock leveler includes a guard-lifting linkage. The guard-lifting linkage is coupled to the ramp and the guard such that raising the ramp from the first position to the second position raises the guard from the lowered position to the raised position.

In yet another embodiment of the invention, the dock leveler includes a manually-activated mechanical linkage. The manually-activated mechanical linkage is coupled to the guard and facilitates lowering the guard from the raised position into the lowered position.

In another embodiment, a dock leveler includes a frame, a kick-out strike, and a linkage. The frame is positioned within a cavity disposed in an upper dock surface. The kick-out strike is connected to the frame and the linkage (e.g., the mechanical linkage noted above) is coupled to the guard. When the ramp is lowered to a declined position, the kick-out strike contacts and moves the linkage to rotate the guard to the lowered position.

Other features and advantages of the invention will become apparent to those skilled in the art upon review of the following detailed description, claims, and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter.

DETAILED DESCRIPTION OF THE INVENTION

Figure 1:
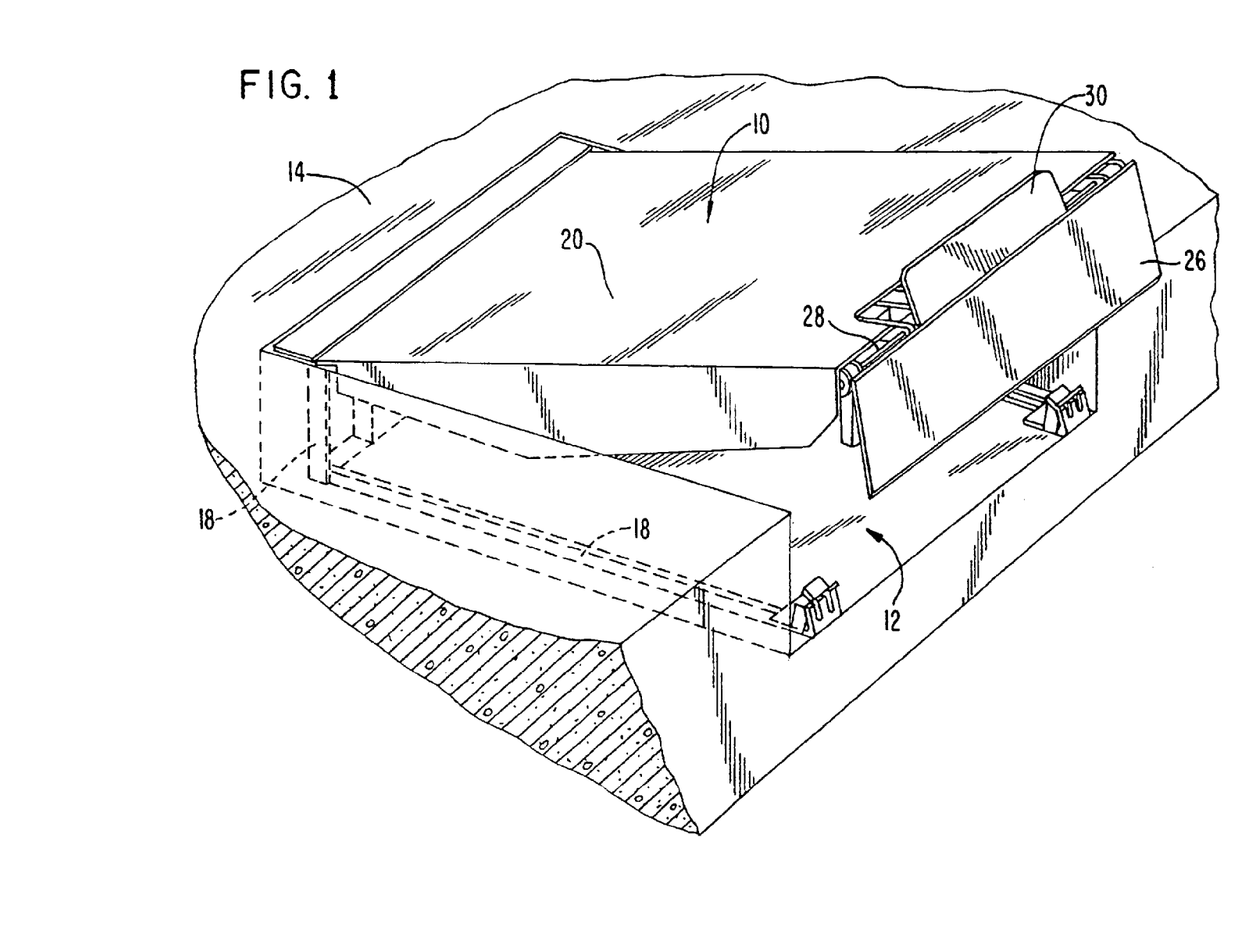
FIG. 1 is a perspective view illustrating a dock leveler embodying the present invention.

FIG. 1 illustrates a dock leveler 10 that is mounted in a pit 12 in a loading dock 14. The dock leveler 10 includes a frame 18 mounted in the pit 12, and a ramp 20 pivotally mounted to the upper end of the frame 18 in a conventional manner. The ramp 20 is movable between multiple positions: (i) an upwardly inclined position above the loading dock 14, (ii) a generally horizontal, stored, or dock-level position that is flush and substantially co-planar with the loading dock 14, and (iii) a downwardly declined position below the loading dock 14. The ramp 20 is moved between the various positions by conventional methods such as hydraulic actuators, springs, air inflatable bladders, or the like.

The dock leveler 10 further includes an extension lip 26 that is hinged to the forward end of ramp 20 by a lip hinge pin 28. The extension lip 26 is pivotable from a downwardly hanging pendant position to an outwardly extending position. The extension lip 26 is actuated by a conventional lip extension mechanism (not shown) in response to moving the ramp (e.g., lowering the ramp 20 from the inclined position to the dock-level position). When the lip 26 is moved to its outwardly extending position, the lip 26 is generally co-planar with the ramp 20, thus forming an extension of the ramp 20. The lip 26 can be moved from its pendant position to its extended position and held in its extended position by various mechanical, hydraulic or pneumatic mechanisms that are well known to those skilled in the art.

A run-off guard 30 is pivotally mounted to the forward end of the ramp 20 by the lip hinge pin 28 and extends away from the lip hinge pin 28 in a direction generally opposite the lip 26. The guard 30 is rotatable between a raised position and a lowered position independent of lip 26 when the lip 26 is in the pendant position. In the raised position, the guard 30 forms a barrier that restricts dock loading equipment such as a forklift or pallet jack from rolling off of the end of the dock leveler 10. In the lowered position, the guard 30 is substantially parallel with the ramp 20 and allows dock loading equipment to pass over onto the lip 26 that is extended onto a vehicle bed. The guard 30 may be in the lowered position with the lip 26 in the pendant position to allow for end loading, in which cargo can be unloaded from a vehicle even though the lip 26 cannot be extended onto the bed of the vehicle.

Figure 2:
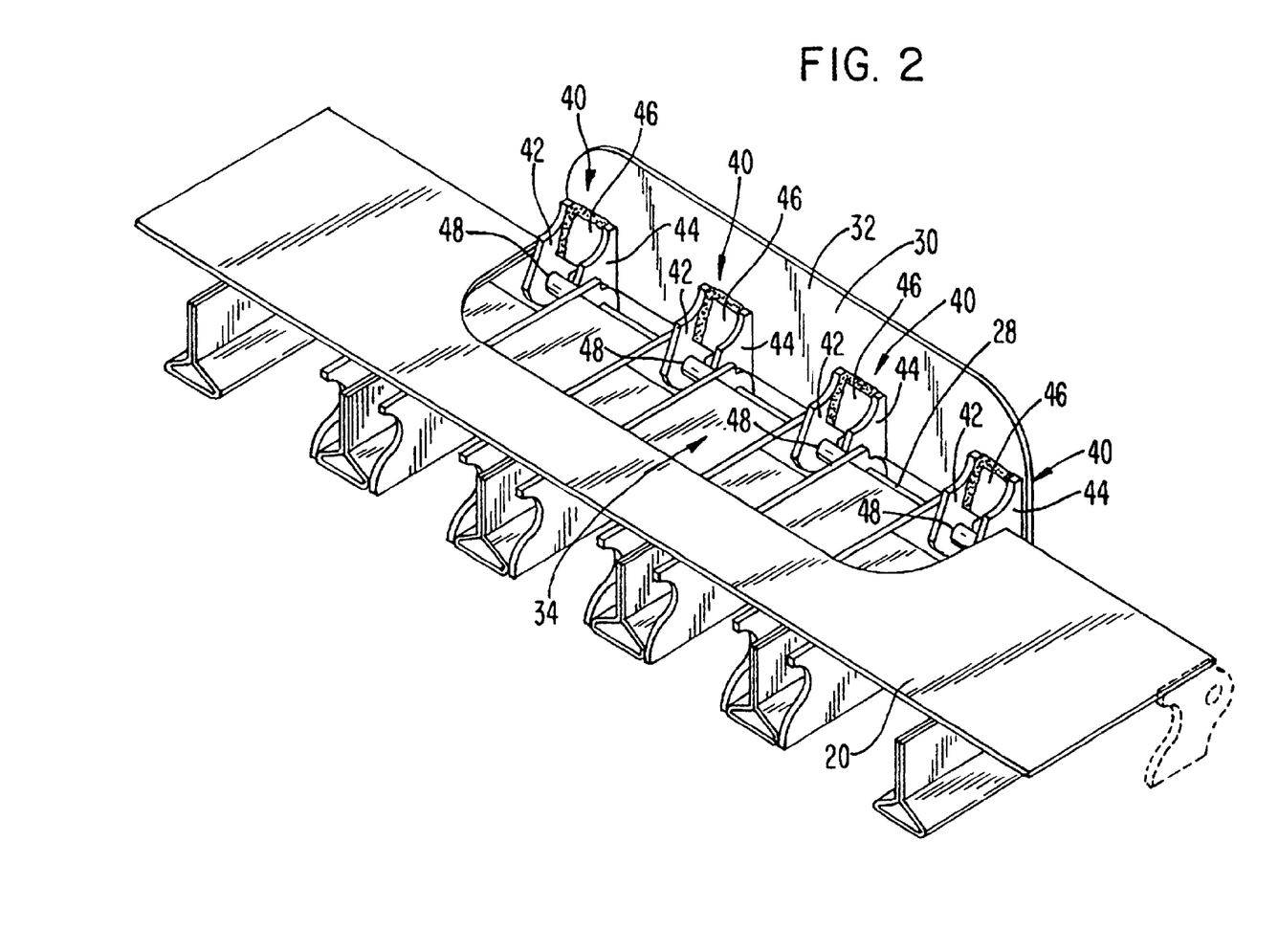
FIG. 2 is a partial perspective view of the dock leveler of FIG. 1, illustrating the guard mounting hardware.
Figure 3:
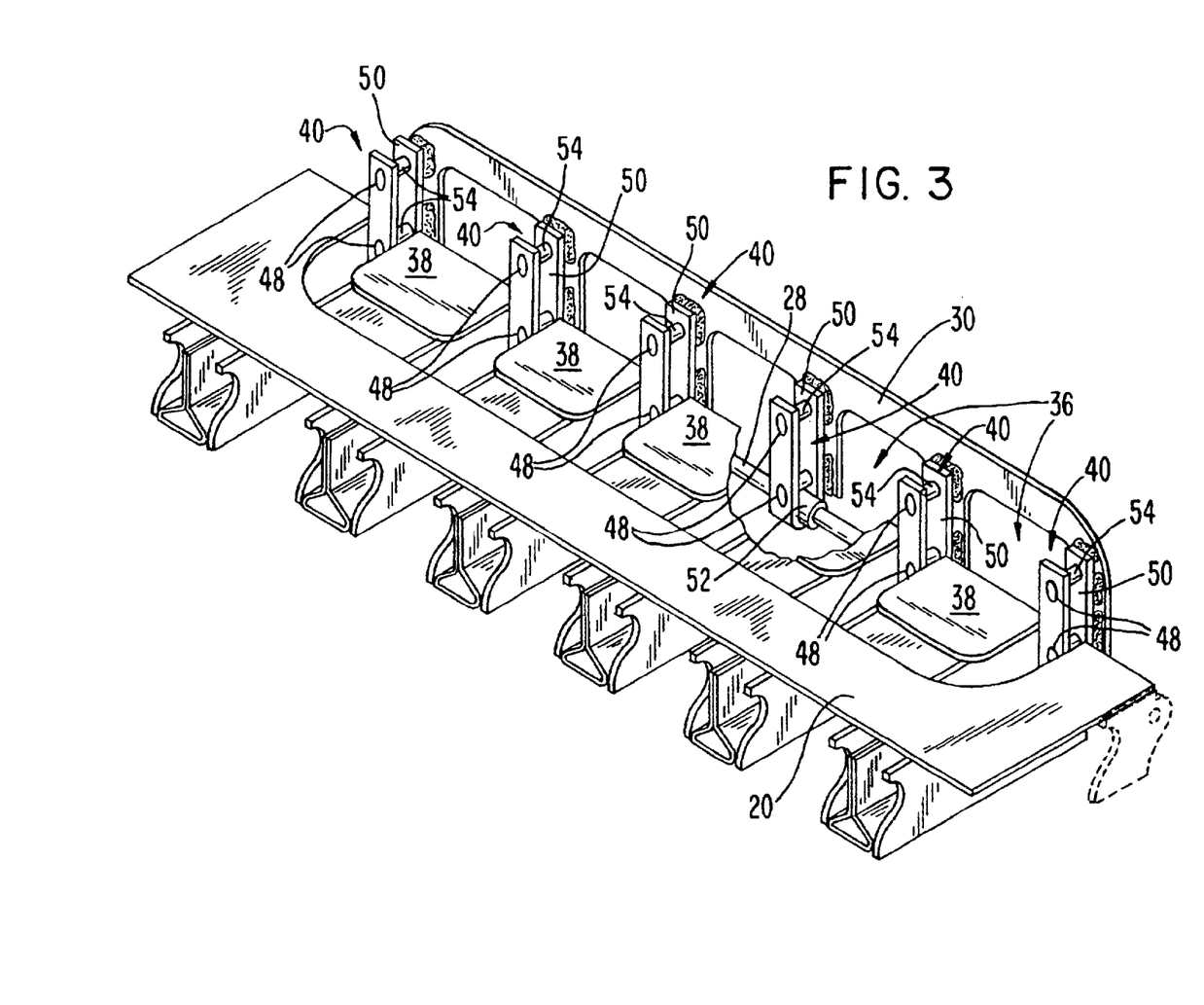
FIG. 3 is a partial perspective view of the dock leveler of FIG. 1, illustrating a second embodiment of guard mounting hardware.
Figure 4:
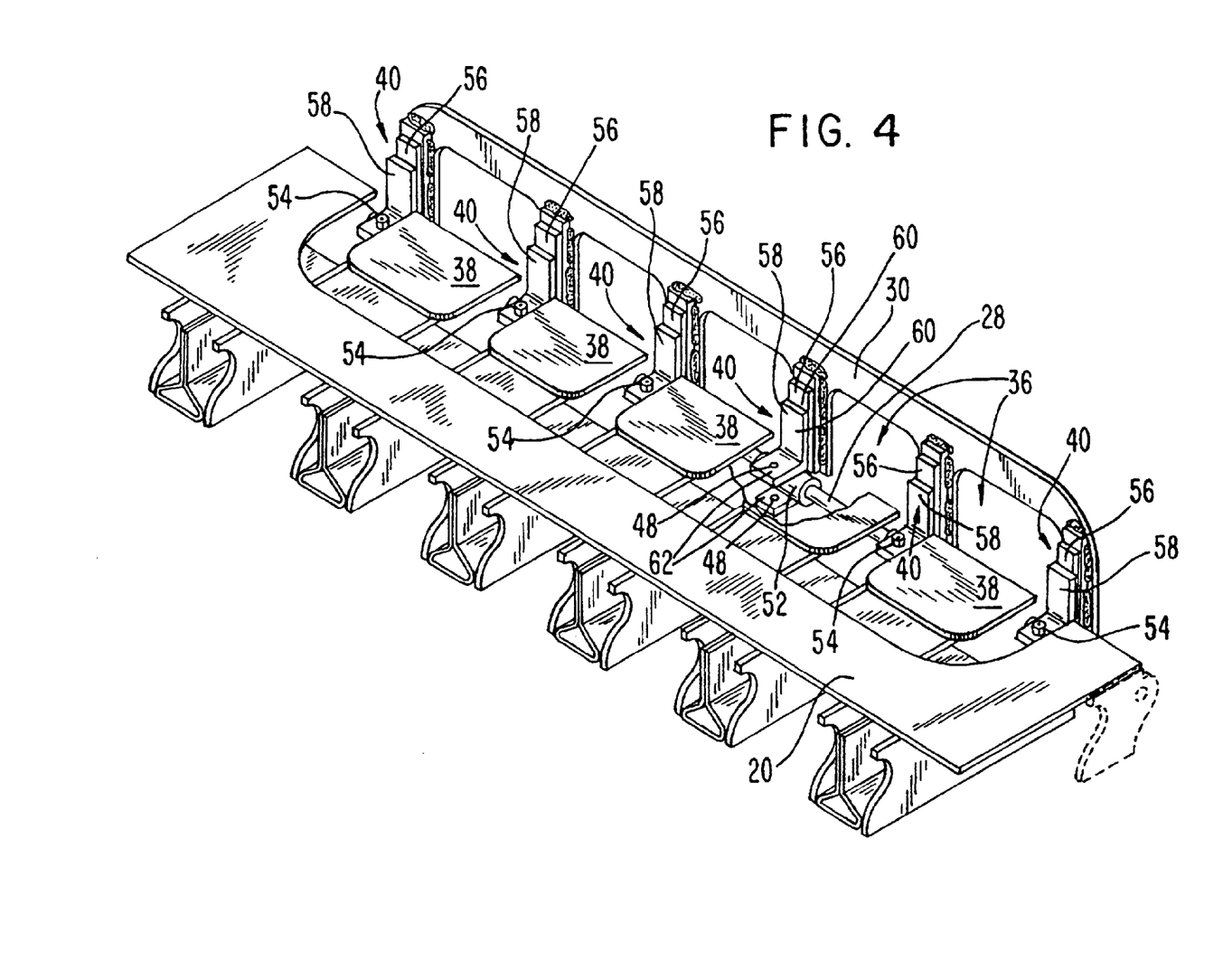
FIG. 4 is a partial perspective view of the dock leveler of FIG. 1, illustrating a third embodiment of guard mounting hardware.
Figure 5:
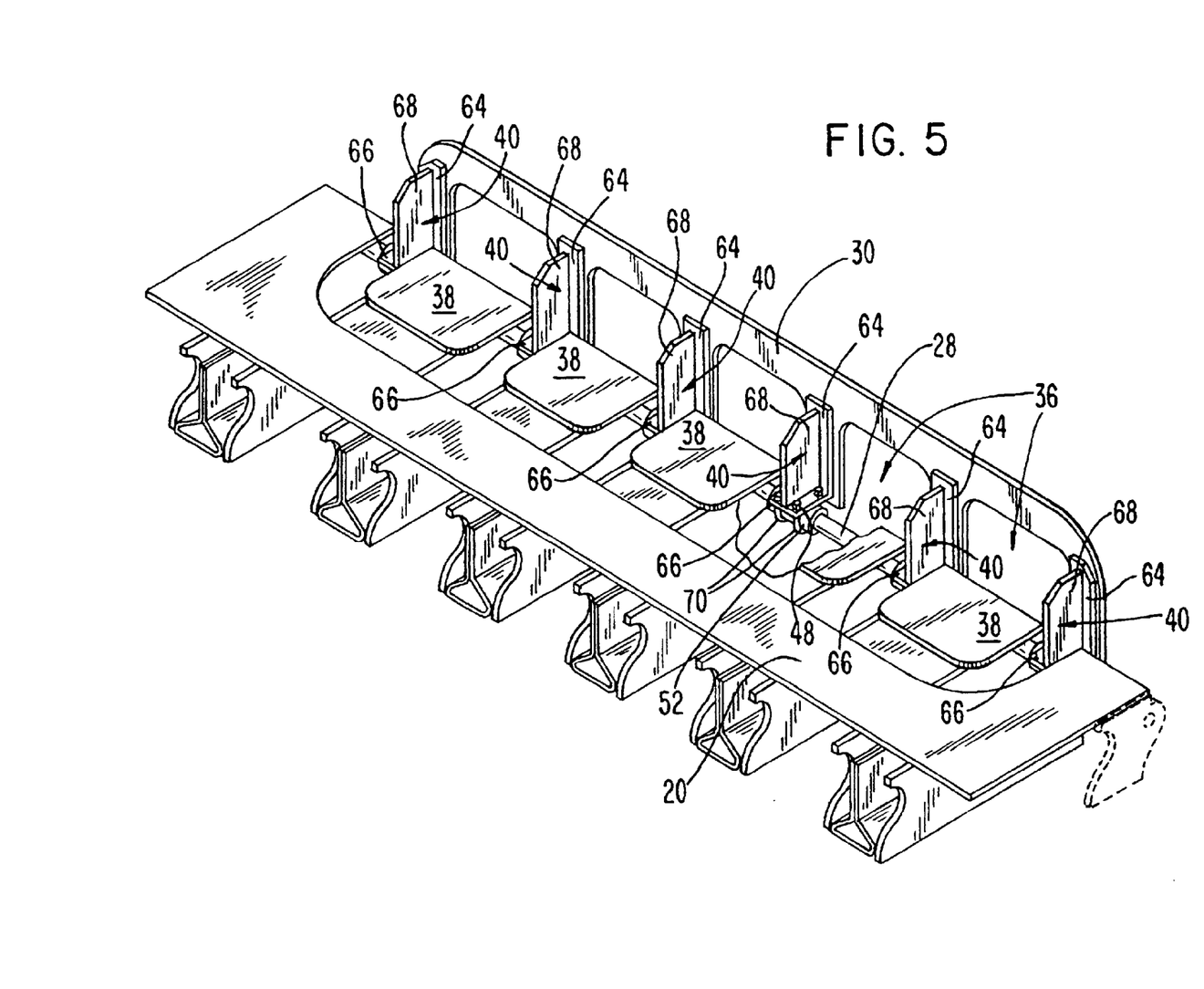
FIG. 5 is a partial perspective view of the dock leveler of FIG. 1, illustrating a fourth embodiment of guard mounting hardware.
Figures 11, 12:
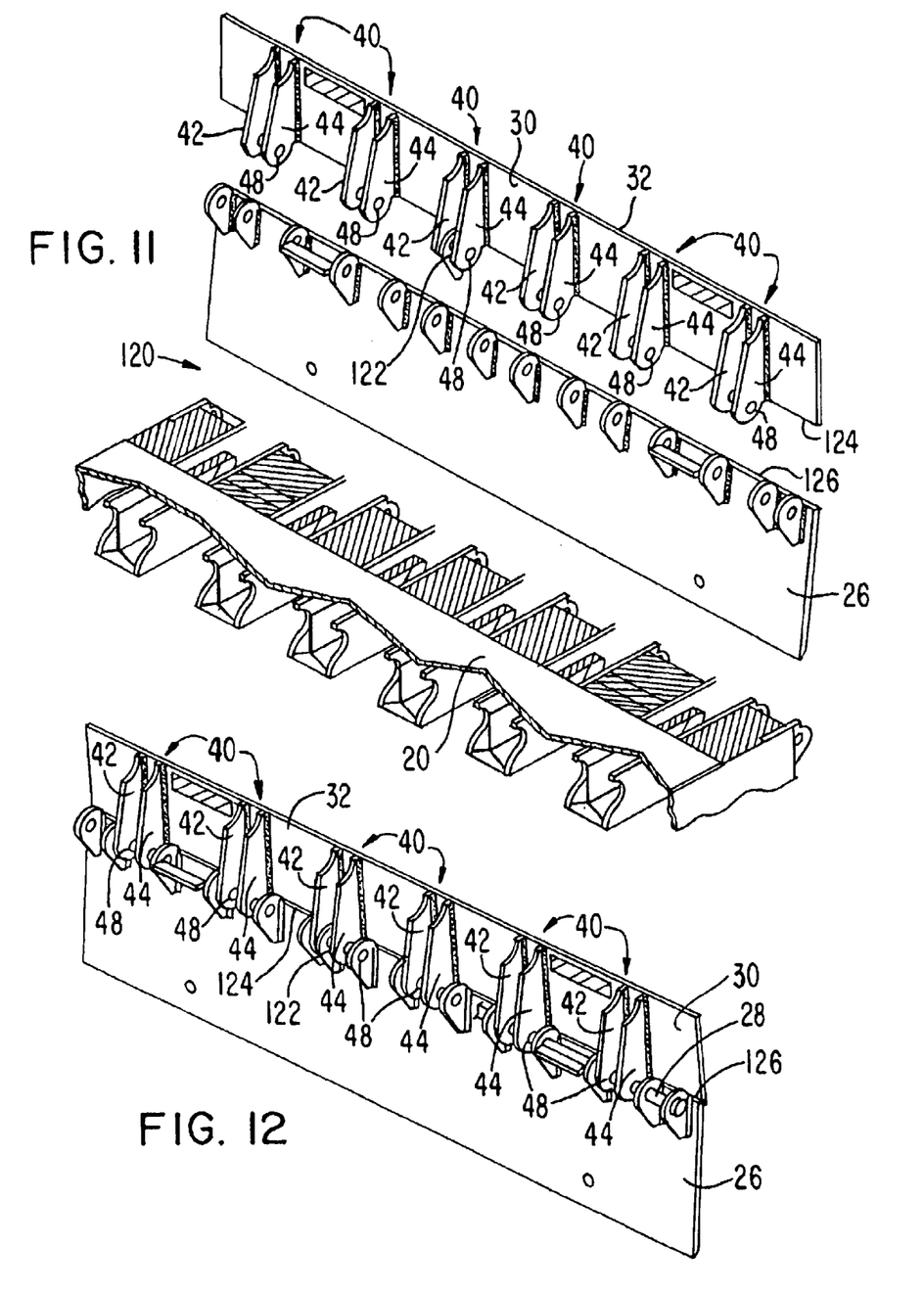
FIG. 11 is a partial exploded view of another dock leveler, illustrating a flange on a guard.
FIG. 12 is a perspective view of the guard of FIG. 11 connected with a lip.

The shape of the guard 30 can be varied as shown in FIGS. 2–5 and 11. For example, the guard 30 can be a solid plate 32 that corresponds to a cutout section 34 of the ramp 20 as shown in FIG. 2 and can either extend the entire width as shown in FIG. 11 or a fraction of the width of the ramp 20. As shown in FIGS. 3–5, the guard 30 can also be shaped with multiple cutout sections 36 that correspond to isolated ramp sections 38 that form part of the ramp 20 surface.

The guard 30 in FIG. 2 is pivotally mounted to the ramp 20 by inserting the lip hinge pin 28 through mounting brackets 40 that are mounted to the guard 30. The mounting brackets 40 include a first flange 42 and a second flange 44 that are connected to a middle portion 46 between the first and second flange 42, 44. The middle portion 46 is preferably welded to the guard 30, but can be mechanically fastened by other methods known to those skilled in the art. The first and second flange 42, 44 each include a hole 48 through which the lip hinge pin 28 is inserted.

The guard 30 may become damaged by loading equipment that collides with the guard 30 when the guard 30 is in the raised position, requiring the damaged guard 30 to be replaced. It is common for loading docks 14 to have limited space across the width of the dock leveler 10, and it is not always convenient or possible to remove the lip hinge pin 28 from the side of the dock leveler 10 in order to remove the damaged guard 30. In this situation, the entire dockleveler 10 would typically be pulled from the pit 28. As an alternative to removing the entire dock leveler 10 from the pit 12, the mounting brackets 40 disclosed in FIGS. 3–5 allow the guard 30 to be removed without requiring the removal of the lip hinge pin 28.

FIG. 3 illustrates an alternate embodiment of a mounting bracket 40 that simplifies the replacement of the guard 30. Each mounting bracket 40 includes a U-bracket 50 that is mounted to the guard 30 and has two sets of aligned holes 48 that run perpendicular to the guard 30. A bushing 52 that surrounds the lip hinge pin 28 is held within the U-bracket 50 by a bolt 54 inserted into the first set of holes 48 and reinforced by a bolt 54 inserted into the second set of holes 48. The guard 30 is disconnected from the lip hinge pin 28 by removing the bolts 54 from the first and second set of holes 48 in the U-brackets 50 and then sliding the U-brackets 50 around the bushings 52 that remain on the lip hinge pin 28.

FIG. 4 illustrates another embodiment of a mounting bracket 40 that includes a first L-bracket 56 and a second L-bracket 58 that are connected together along back portions 60 by welding or by another conventional method to separate forward portions 62 of the L-brackets 56, 58 by a distance. The back portion 60 of the first L-bracket 56 is mounted to the guard 30, and a bushing 52 that is connected to the lip hinge pin 28 is secured between the forward portions 62 of the L-brackets 56, 58 by a bolt 54 that is inserted through holes 48 in the forward portions 62. The guard 30 is disconnected from the ramp 20 by removing the bolts 54 from the holes 48 of the forward portions 62 and sliding the L-brackets 56, 58 and guard 30 off of the bushings 52 that remains on the lip hinge pin 28.

Another embodiment of the mounting bracket 40 is shown in FIG. 5 and includes an upper portion 64 connected to the guard 30 and a lower portion 66 that extends perpendicularly away from the guard 30 and the upper portion 64. A rib 68 is connected between the upper portion 64 and the lower portion 66 to reinforce and strengthen the mounting bracket 40. A bushing 52 is coupled to the lip hinge pin 28 and attached to the lower portion 66 by two U-bolts 70 that are inserted into corresponding holes 48 located on the lower portion 66. The guard 30 is disconnected from the ramp 20 by removing the U-bolts 70 from the lower portions 66 and then lifting the guard 30 away from the bushings 52 that remain on the lip hinge pin 28.

Figure 6:
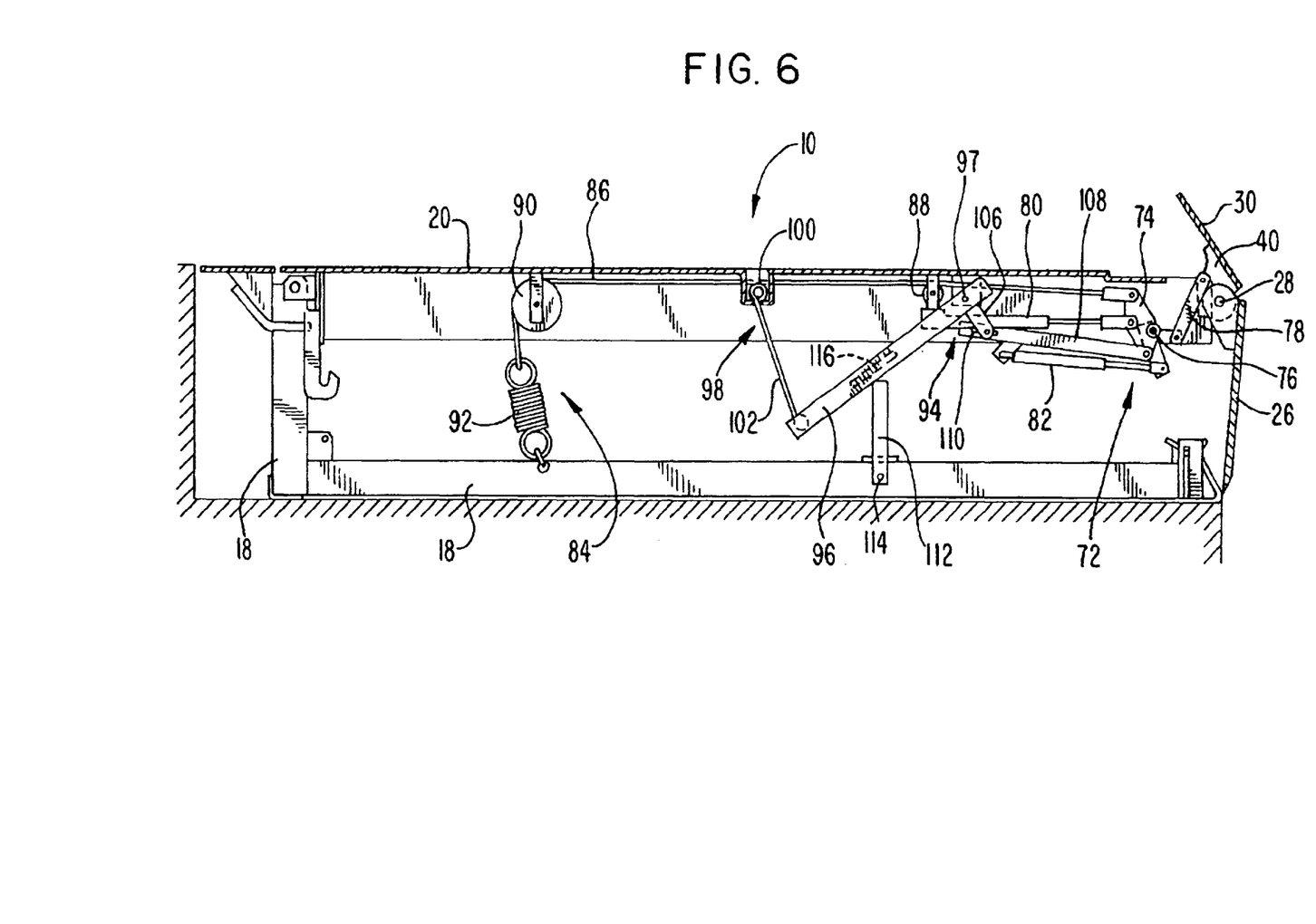
FIG. 6 is a longitudinal section view of the dock leveler shown in FIG. 1.

Referring now to FIG. 6, the dock leveler 10 also includes a biasing assembly 72 for selectively biasing the guard 30 toward the raised or lowered position. The illustrated biasing assembly 72 includes a bell crank 74 that is rotatably mounted to the ramp 20 for rotation about an axis 76. The bell crank 74 is coupled to a first guard link 78 that is rotatably coupled to the mounting bracket 40 such that rotation of the bell crank 74 moves the first guard link 78 to rotate the mounting bracket 40 and the guard 30 about the lip hinge pin 28.

The illustrated biasing assembly 72 further includes a gas spring 80 that is coupled to the ramp 20 at one end and coupled to the bell crank 74 at the other end. The gas spring 80 is at its maximum compression distance when the guard 30 is at an intermediate position between the raised and the lowered position. At the intermediate position, the biasing force of the gas spring 80 is directed through the axis 76 of rotation of the bell crank 74, therefore the biasing force of the gas spring 80 in this position does not create any rotation force on the bell crank 74. Rotation of the bell crank 74 in the clockwise direction moves the gas spring 80 over center such that the gas spring 80 forces the bell crank 74 to continue to rotate to pull the guard 30 into the lowered position. Rotation of the bell crank 74 in the counter-clockwise direction from the intermediate position moves the gas spring 80 under center such that gas spring 80 continues to rotate the bell crank 74 to push the guard 30 into the raised position. In this manner, the gas spring 80 can bias the guard 30 toward either the lowered position or the raised position, depending on the position of the guard 30.

The illustrated biasing assembly 72 also includes a damper 82 coupled to the ramp 20 and to the bell crank 74 for decreasing the velocity of the guard 30 when the guard 30 moves between the raised and lowered positions. The damper 82 reduces the slamming effect of the biased guard 30 by creating a counter-force when the velocity of the guard 30 is high while creating little to no counter-force when the velocity of the guard 30 is low. The damper 82 is designed to have a greater damping force when the guard 30 is moving toward the lowered position compared to when the guard 30 is moving toward the raised position. In a preferred embodiment, the damper 82 provides little to no damping force when the guard 30 moves toward the raised position.

Figure 7:
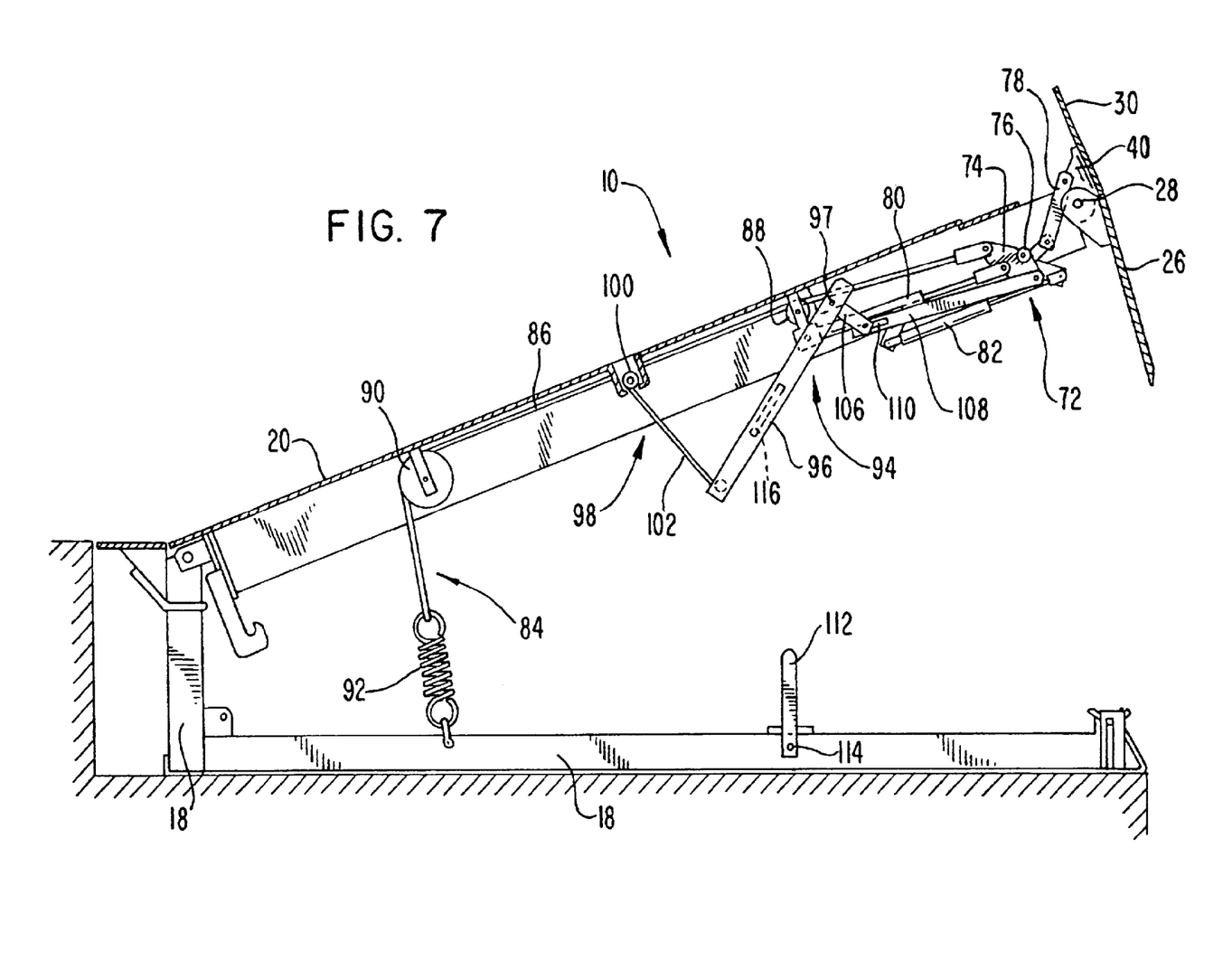
FIG. 7 is a section view similar to FIG. 6, illustrating the ramp in the inclined position and the guard in the raised position.

FIG. 7 illustrates a raising linkage 84 that elevates the guard 30 in response to the ramp 20 being moved into the inclined position. The raising linkage 84 preferably includes a cable 86 coupled to the bell crank 74 and to the frame 18 such that when the ramp 20 is raised the cable 86 tightens and rotates the bell crank 74 in the counter-clockwise direction to raise the guard 30. The cable 86 is preferably directed around a forward pulley 88 and a rearward pulley 90 that are rotatably connected to the ramp 20. The positions of the pulleys 88, 90 ensure that the tension of the cable 86 is increased when the ramp 20 is raised from the horizontal position to the inclined position and ensures that the cable 86 does not interfere with other components of the dock leveler 10. The raising linkage 84 preferably includes a spring 92 coupled between the cable 86 and the frame 18 such that when the ramp 20 and guard 30 are raised, the spring 92 acts as a lost motion member allowing the ramp 20 to reach its maximum inclined position necessary for engagement of the lip extension mechanism.

Raising the ramp 20 increases the distance between the rearward pulley 90 and the connection point of the spring 92 on the frame 18 to increase the tension in the cable 86. The increased cable 86 tension causes the cable 86 to extend the spring 92 and rotate the bell crank 74 in the counter-clockwise direction. The rotation of the bell crank 74 pushes the gas spring 80 under center such that the gas spring 80 continues to rotate the bell crank 74 to push the guard 30 toward the raised position.

When the ramp 20 is lowered from the inclined position to the horizontal position, the lip 26 is raised into the extended position to engage a vehicle bed for loading and unloading. The lip 26 can be raised by a passive linkage system or independently by hydraulics or the like. A suitable system is illustrated in U.S. Pat. No. 5,475,888. As the ramp 20 is moved toward the operational position, the mechanism to raise the lip 26 will overcome the biasing force holding the guard 30 in the raised position. In the preferred embodiment, the guard 30 will always be in the lowered position when the lip 26 is in the extended position. However, a guard 30 that moves independently of the position of the lip 26 can also be used without departing from the scope of the present invention.

Figure 8:
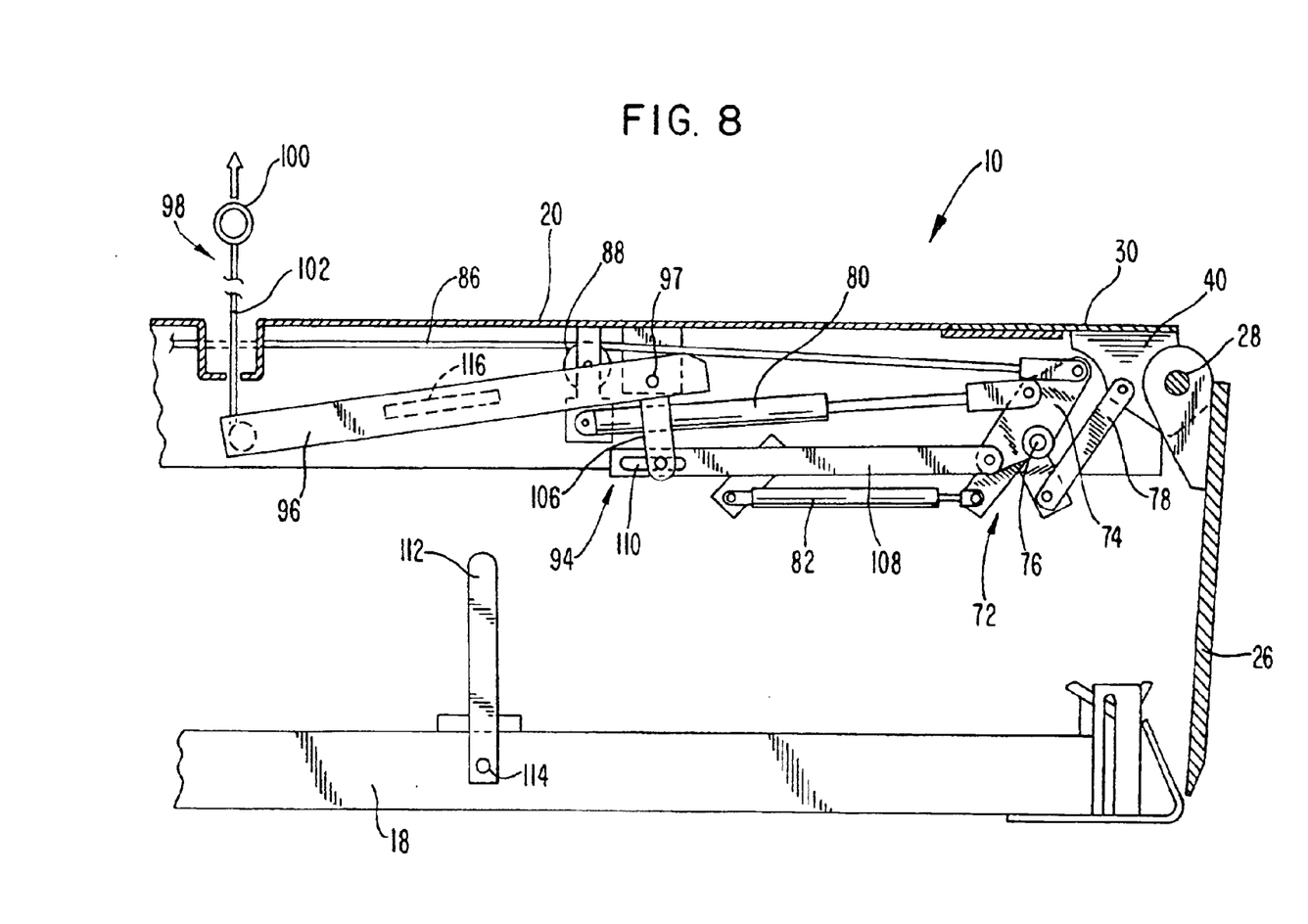
FIG. 8 is an enlarged section view similar to FIG. 6, illustrating the ramp in the horizontal position and the guard in the lowered position in response to the manually-activated linkage.

With reference to FIG. 8, the dock leveler 10 includes a pull-down linkage 94 that allows an operator to manually move the guard 30 into the lowered position. The pull-down linkage 94 is coupled to the bell crank 74 such that movement of the pull-down linkage 94 rotates the bell crank 74 in the clockwise direction thereby lowering the guard 30. The pull-down linkage 94 includes a first pull-down link 96 that is pivotally connected to the ramp 20 at a pivot point 97, and a manual release 98 at the other end. The manual release 98 includes a ring 100 that is accessible by an operator on the top of the ramp 20 and a chain 102 that is connected between the ring 100 and the pull-down link 96. The pull-down linkage 94 also preferably includes a second pull-down link 106 connected to the first pull-down link 96 and extends substantially perpendicularly away from the first pull-down link 96, and a third pull-down link 108 that is coupled between the second pull-down link 106 and the bell crank 74. The third pull-down link 108 includes a lost motion slot 110 that allows the first and second pull-down links 96, 106 to activate the biasing assembly 72 while at the same time allowing the continued motion of the biasing assembly 72 and the third pull-down link 108 independent of the first and second pull-down links 96, 106.

The guard 30 is lowered for an end loading operation when an operator grabs the ring 100 that is exposed on the top surface of the ramp 20 and pulls the ring 100 to lift the chain 102 upward thereby moving the second end of the first pull-down link 96 upward. In response to this upward movement, the first pull-down link 96 is rotated clockwise moving the second pull-down link 106 away from the bell crank 74. The second pull-down link 106 will then slide across the lost motion slot 110 until it abuts against the far end of the slot 110 which will cause the third pull-down link 108 to move with the first and second pull-down links 96, 106. The combined movement of the pull-down links 96, 106, 108 rotate the bell crank 74 in the clockwise direction to move the gas spring 80 over center such that the gas spring 80 will continue to rotate the bell crank 74 to pull the guard 30 into the lowered position. Immediately after the gas spring 80 is moved over center, the bell crank 74 will also move the third pull-down link 108 independently from the first and second pull-down links 96, 106 as the third pull-down link 108 will slide across the lost motion slot 110.

Figure 9:
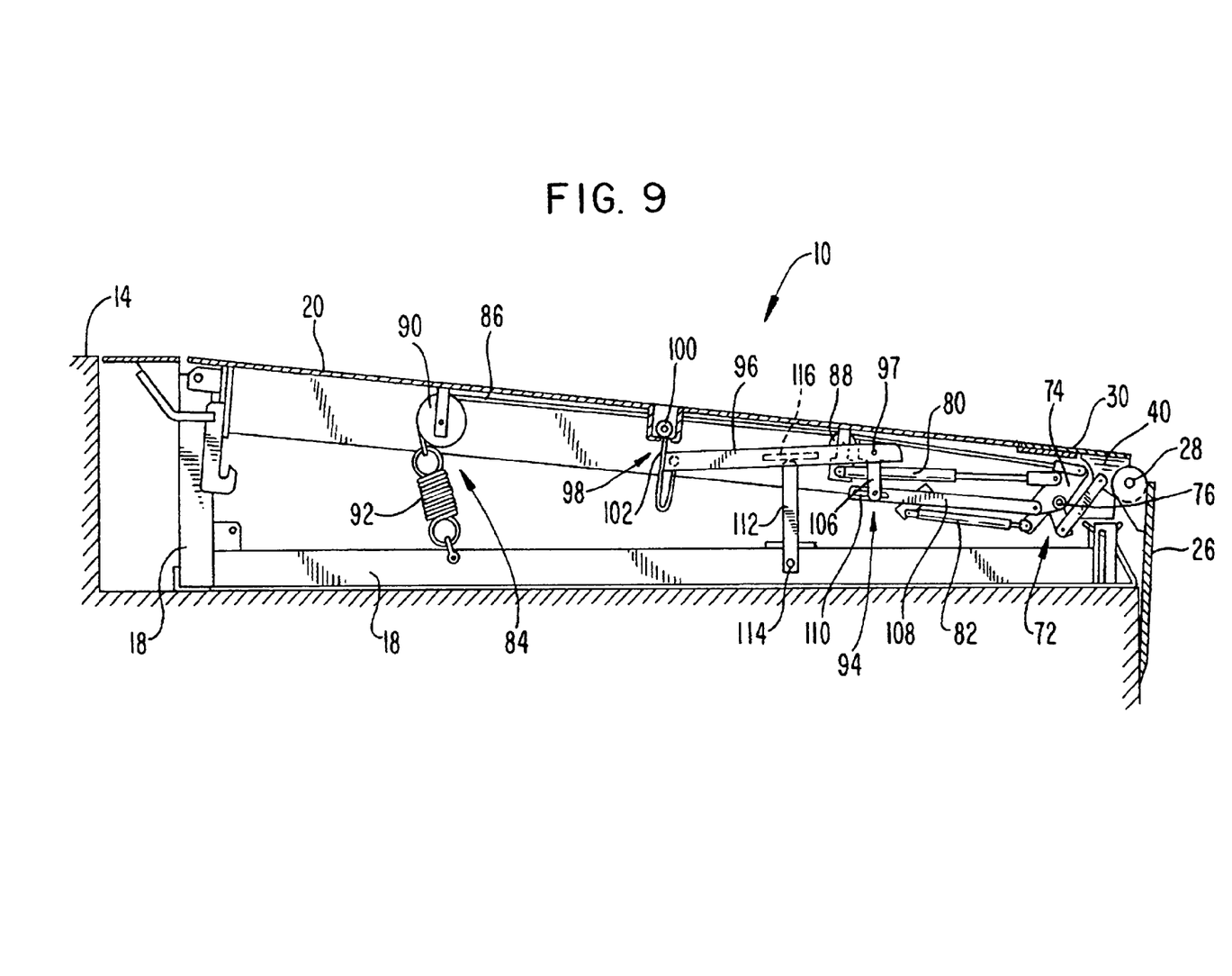
FIG. 9 is a section view similar to FIG. 6, illustrating the ramp in the declined position and the guard in the lowered position in response to the kick-out strike.

FIG. 9 illustrates a kick-out strike 112 that is removably connected to the frame 18 by a fastener 114. The kick-out strike 112 is used to automatically lower the raised guard 30 when the ramp 20 is moved from the horizontal position to a declined position. The ramp 20 is commonly lowered to the declined position to end load cargo to a truck bed that is positioned below the loading dock 14. Lowering the ramp 20 moves the first pull-down link 96 of the pull-down linkage 94 such that a laterally extending plate 116 contacts the kick-out strike 112 causing the pull-down links 96, 106, 108 to rotate the bell-crank 74 and lower the guard 30 in a manner similar to the pull-down linkage 94 described above. The lost motion slot 110 allows the guard 30 to be moved completely into the lowered position by the gas spring 80 without requiring any further movement of the first pull-down link 96. Without the lost motion slot 110, the first pull-down link 96 could collide with the ramp 20 and prevent the guard 30 from lowering completely to the lowered position.

Figure 10:
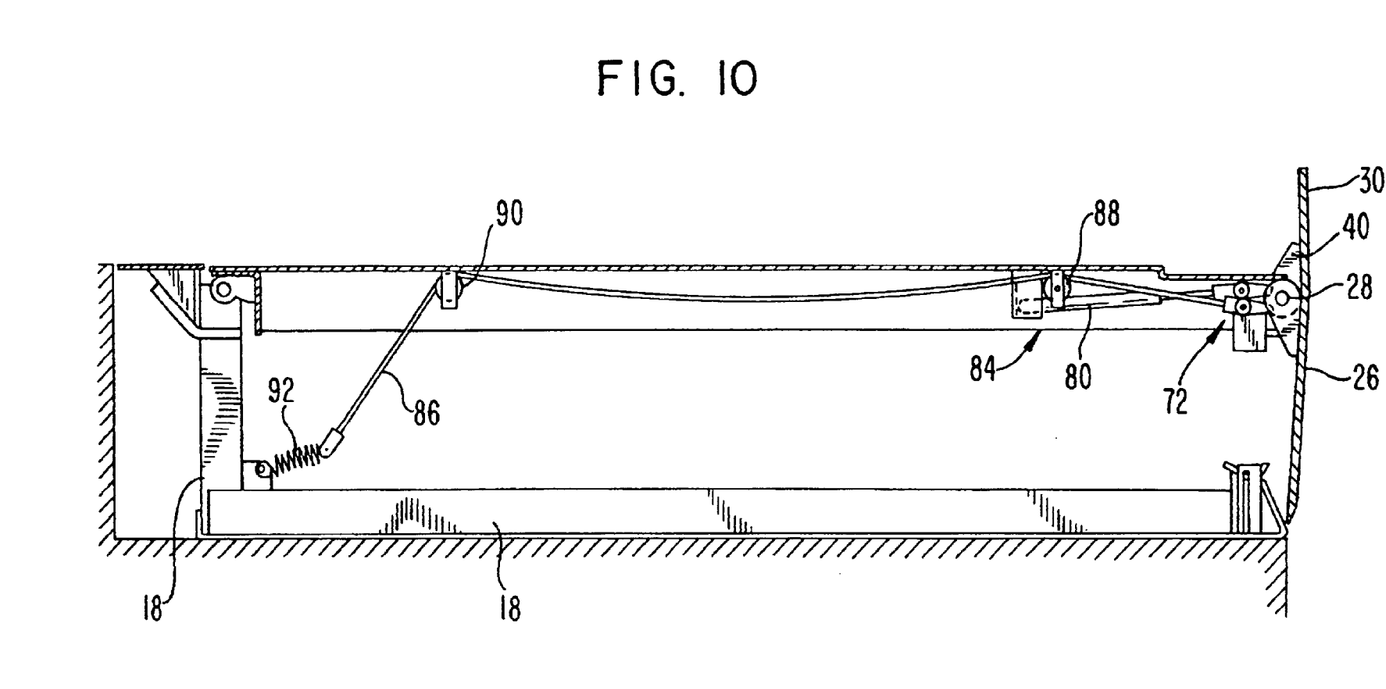
FIG. 10 is a longitudinal section view of an alternative embodiment of the invention.

FIG. 10 illustrates an alternative embodiment of the invention that includes a biasing assembly 72 and a raising linkage 84. The gas spring 80 of the biasing assembly 72 is connected directly to the mounting bracket 40 such that rotation of the mounting bracket 40 will move the gas spring 80 over center to either bias the guard 30 toward the raised position or the lowered position. The cable 86 is also connected directly to the mounting bracket 40 such that when the ramp 20 is raised the tension increases in the cable 86 causing the mounting bracket 40 to rotate clockwise about the lip hinge pin 28. A pull-down linkage 94 and kick-out strike 112 could also be incorporated into this embodiment by similarly connecting a pull-down link directly to the mounting bracket 40 without departing from the scope of the invention.

FIG. 11 illustrates a dock leveler 120 that includes a ramp 20, lip 26, and run-off guard 30 similar to those illustrated in FIG. 2. The guard 30 includes mounting brackets 40 having first and second flanges 42, 44 and is pivotally connected to the lip hinge pin (FIG. 12) by positioning the lip hinge pin through holes 48 in the first and second flanges 42, 44.

The guard 30 is moved in response to the movement of the lip 26 and is not actuated independently by a biasing assembly. The guard 30 includes a flange 122 that is preferably welded to the rear face of the guard 30 and that includes a portion that extends past the lower edge 124 of the guard 30. When the guard 30 is connected with the lip 26, the flange 122 contacts the rear face of the lip 26 and the lower edge 124 of the guard 30 contacts the upper edge 126 of the lip 26. During operation, a conventional lip extension mechanism (not shown) raises or lowers the lip 26, and the flange 122 and contacting edges 124, 126 cause the guard 30 to move simultaneously with the lip 26. Therefore, when the lip 26 is in the pendant position the guard 30 is in the raised or blocking position, and when the lip 26 is in the raised position the guard 30 is in the lowered or unblocking position.

As opposed to known dock levelers that have guards 30 integral with the lip 26 for simultaneous movement, the separate guard 30 with the flange 122 allows the guard 30 to be replaced independent of the lip 26 when the guard 30 is damaged. In addition, the guard 30 with the flange 122 can easily be converted into a guard that is independently movable relative to the lip 26. For example, only the flange 122 would need to be removed from the guard 30 to install a biasing assembly directly to the guard 30 in order to independently operate the guard 30 from the lip 26.

Figures 13, 14:
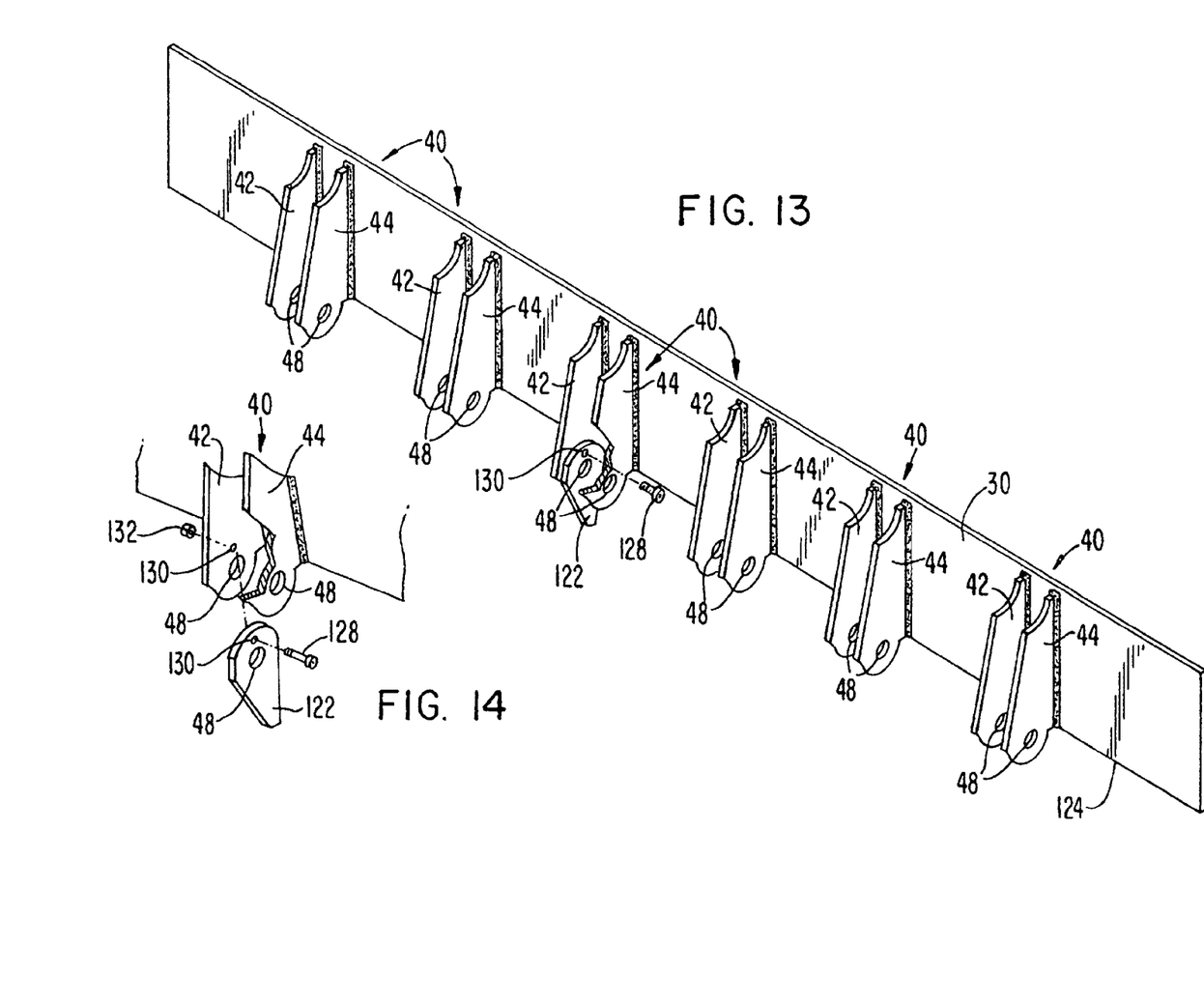
FIG. 13 is a perspective view of the guard shown in FIG. 11, illustrating an alternative flange.
FIG. 14 is an enlarged exploded view of the flange shown in FIG. 13.

FIGS. 13 and 14 illustrate an alternative flange 122 that is connected to the guard 30 by a fastener 128 (e.g., a bolt or screw) that is positioned through a hole 130 and attached to a nut 132. The dock leveler 10 can be shipped with the flange 122 unconnected to the guard 30 so that the guard 30 can move independently of the lip 26 to improve the stackability of the dock levelers 10. Then, after a dock leveler 10 is shipped and installed, the flange 122 can be easily fastened to the guard 30 by inserting the fastener 128 through the hole 130 and tightening the nut 132.

We claim:

1. A dock leveler adapted to be mounted to a loading dock, the dock leveler comprising:

a ramp adapted to be rotatably coupled to the loading dock;

a guard coupled to the ramp, the guard being rotatable between a raised position that forms a barrier and a lowered position; and;

a gas spring coupled to the guard, wherein the gas spring biases the guard toward the raised position when the guard is in the raised position, and wherein the gas spring biases the guard toward the lowered position when the guard is in the lowered position.

2. The dock leveler as claimed in claim 1, further comprising a linkage between the biasing member and the guard.

3. The dock leveler as claimed in claim 1, further comprising a damper coupled to the guard, wherein the damper shows the downward motion of the guard.

4. The dock leveler as claimed in claim 1, further comprising a linkage that raises the guard from the lowered position to the raised position when the ramp is raised from a first position to a second position.

5. The dock leveler as claimed in claim 1, further comprising a manually-activated mechanical linkage that can be used to lower the guard from the raised position into the lowered position.

6. A dock leveler adapted to be mounted to a loading dock, the dock leveler comprising:

a ramp adapted to be rotatably coupled to the loading dock;

guard coupled to the ramp, the guard being rotatable between a raised position that forms a barrier and a lowered position;

a spring coupled to the guard, wherein the spring biases the guard toward the raised position when the guard is in the raised position, and wherein the spring biases the guard toward the lowered position when the guard is in the lowered position; and;

wherein the spring biases the guard toward the raised position when the spring is over center in a first direction and the spring biases the guard toward the lowered position when the spring is over center in a second direction.

7. A dock leveler adapted to be mounted to a loading dock, the dock leveler comprising:

a ramp adapted to be rotatably coupled to the loading dock;

a guard coupled to the ramp, the guard being rotatable between a raised position that forms a barrier and a lowered position;

a biasing member coupled to the guard, wherein the biasing member biases the guard toward the raised position when the guard is in the raised position, and wherein the biasing member biases the guard toward the lowered position when the guard is in the lowered position; and;

a linkage between the biasing member and the guard, wherein the linkage includes a bell crank rotatably coupled to the frame and a link coupled to the bell crank and the guard.

8. The dock leveler as claim 7, wherein the biasing member is coupled to the bell crank such that rotation of the bell crank in one direction moves the biasing member over center in one direction to bias the guard toward the raised position and rotation of the bell crank in an opposite direction moves the biasing member over center in an opposite direction to bias the guard toward the lowered position.

9. A dock leveler adapted to be mounted to a loading dock, the dock leveler comprising:

a ramp adapted to be rotatably coupled to the loading dock;

a guard coupled to the ramp, the guard being rotatable between a raised position that forms a barrier and a lowered position;

a biasing member coupled to the guard, wherein the biasing member biases the guard toward the raised position when the guard is in the raised position, and wherein the biasing member biases the guard toward the lowered position when the guard is in the lowered position; and;

a kick-out strike adapted to be coupled to the loading dock below the ramp, and a linkage coupled to the guard, wherein lowering of the ramp to a declined position causes the kick-out strike to contact and move the linkage to rotate the guard to the lowered position.

* * * * *